INVENTORS
HERBERT WALDMAN
EMERY GELBMAN
BY Hane and Nydick
ATTORNEYS

Dec. 27, 1960 H. WALDMAN ET AL 2,966,359

MACHINE FOR REPRODUCING INTELLIGENCE FROM AN INTELLIGENCE CARRIER

Filed April 3, 1958 2 Sheets-Sheet 2

INVENTORS
HERBERT WALDMAN
EMERY GELBMAN

BY Hane and Nydick

ATTORNEYS

United States Patent Office 2,966,359

Patented Dec. 27, 1960

2,966,359

MACHINE FOR REPRODUCING INTELLIGENCE FROM AN INTELLIGENCE CARRIER

Herbert Waldman, Brooklyn, and Emery Gelbman, Levittown, N.Y., assignors to Robosonic National Industries Corp., New York, N.Y.

Filed Apr. 3, 1958, Ser. No. 726,198

9 Claims. (Cl. 274—11)

The present invention relates to machines for reproducing intelligence from an intelligence carrier.

The term "intelligence carrier" as herein used, may refer either to the reproduction of sound or the projection of a sequence of pictorial representations. For an audible reproduction the "intelligence carrier" may be any of the carriers known and suitable for the purpose such as magnetic tape or wire, or also film which has a magnetic or optical sound track. For pictorial reproduction the intelligence carrier may be motion picture film. It is of course also possible and within the scope of the invention to reproduce simultaneously audible and pictorial intelligence. Reference is made in the subsequent description primarily to reproduction from magnetic tape, but no limitation is intended by such reference.

In the use of machines of the general kind above referred to, it is often necessary or desirable to reproduce once or repeatedly a selected section only of the intelligence carrier. Since the intelligence carriers used in modern machines are usually of very considerable length, it is inconvenient and time consuming first to locate the section to be reproduced, and then to start and stop the machine at the beginning and end respectively of the reproduction. If the reproduction of the selected section is to be repeated, the operator must perform substantially the same operations for each repeat.

Accordingly, it is an object of the invention to provide a novel and improved device which materially simplifies the reproduction of a pre-selected section once or for any desired number of times.

Another object of the invention is to provide novel and improved means for automatically reproducing a pre-selected section once or repeatedly if desired.

A further object of the invention is to provide a novel and improved device which permits control of the machine for reproduction of a pre-selected section only of the intelligence carrier without requiring any marring or physical contact with the carrier. This feature not only saves the intelligence carrier from wear and tear, but it also facilitates the exchange of tapes or other carriers among friends for instance, or the renting of tapes.

A still further object of the invention, especially applicable to motion picture film or strip film as intelligence carrier, is to provide a device which automatically stops the film when rewound to a pre-selected frame after completion of a presentation. This facilitates repeated production of a selected part of the frame for instance for educational or demonstration purposes.

It is still another object of the invention to provide a novel and improved device which automaticaly activates the normal reproduction forward-speed drive of the machine at the beginning of the pre-selected section, activates the re-wind drive at the end of the section, and stops the re-wind drive when the intelligence carrier is re-wound to the beginning of the section, and which automatically can repeat this cycle as often as desired.

A further object of the invention is to provide a novel and improved device for pre-setting the beginning and end of any section selected for reproduction. The setting of said means initiates and controls the aforementioned automatic operations.

Other and further objects, features and advantages of the invention will be pointed out hereinafter and set forth in the appended claims forming part of the application.

In the accompanying drawing, several preferred embodiments of the invention are shown by way of illustration and not by way of limitation.

To facilitate the understanding of the invention and to simplify the illustration, only those components of the invention are shown that are essential for the understanding thereof. By way of example, the invention is shown in conjunction with a machine for reproducing from magnetic tape, but as is evident, the device of the invention will operate in the same manner when wire or film for instance is used as intelligence carrier.

The control system of the invention may be visualized as constituting a structural part of a tape recording and reproducing machine, or an accessory or attachment for such machine.

Figure 2:
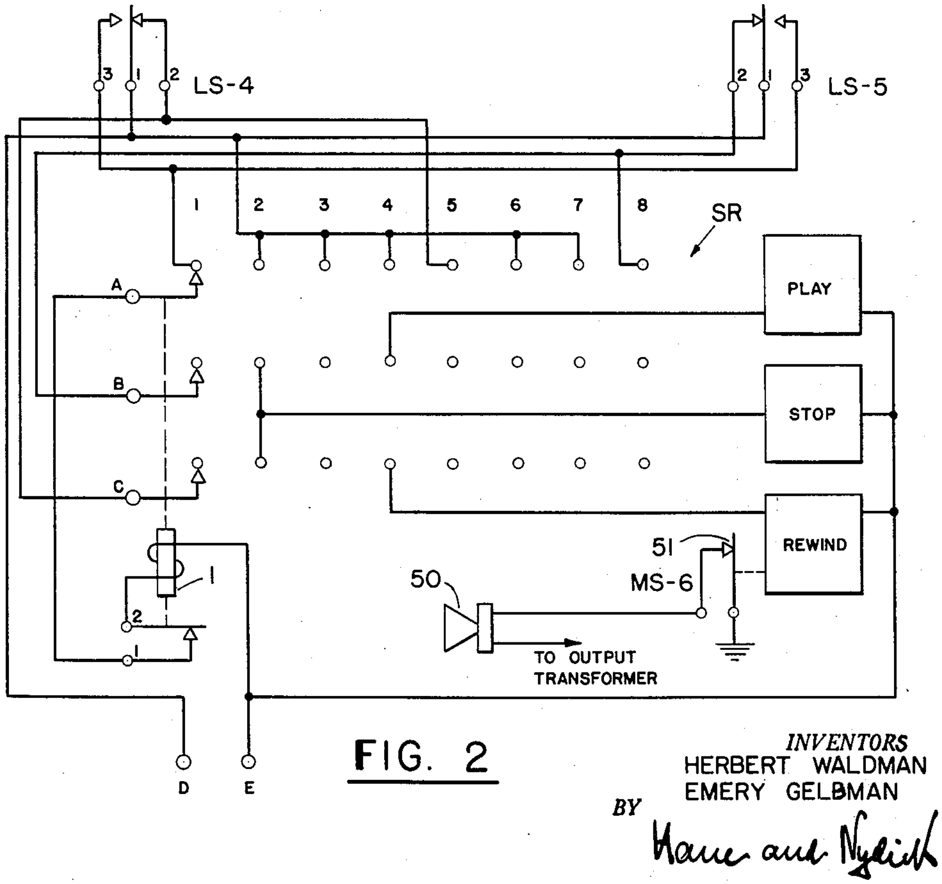
Fig. 2 is a circuit diagram of a control system for controlling the reproduction of the section pre-selected by the setting means of Fig. 1, and, Fig. 3 is a modified circuit diagram of a control system for effecting the reproduction of a pre-selected section.
Figure 3:
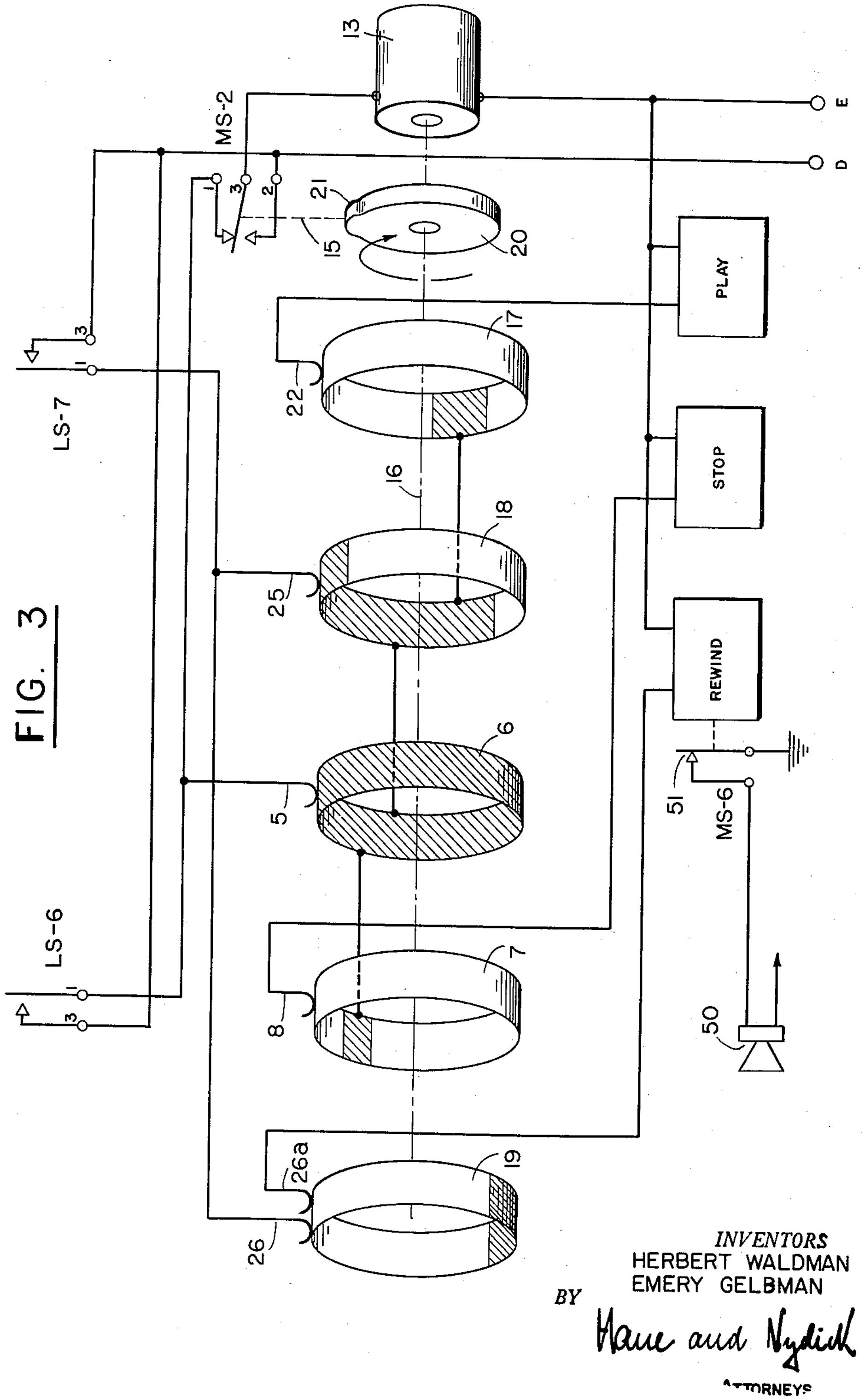

The machine in conjunction with which the control system of the invention is used, should be visualized as having all components that are standard equipment in machines of this kind. More specifically, the machine should be visualized as being equipped with sound reproducing and regulating means, a fast forward drive, playback normal-speed forward drive, a fast re-wind or reverse drive and of course all components which make the drives functional. There are shown in Figs. 2 and 3, three blocks labelled Play, Stop and Re-wind. It is assumed that activation of the block Play starts the normal speed forward drive, that activation of the block Re-wind starts the fast re-wind drive, and that activation of the block Stop stops the drive in operation, that is, either the normal drive or the re-wind drive or the fast forward drive. The latter is not included in the illustrated circuit systems as its operation enters the function of the system according to the invention only to a limited extent.

Figure 1:
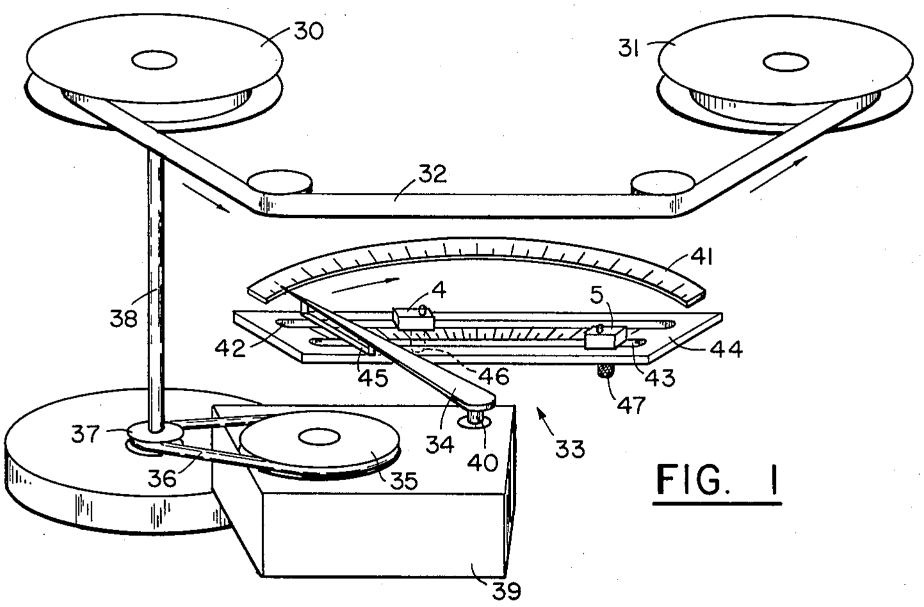
Fig. 1 is a perspective diagrammatic view of the means for setting a selected section of the intelligence carrier for reproduction.

Referring now to Figs. 1 and 2 in detail, Fig. 1 shows a tape supply reel 30 and a take-up reel 31. The tape 32 moves from reel 30 to reel 31 during playback, or when the fast forward drive is active, and from reel 31 to reel 30 during re-wind. Moving from reel 30 to reel 31 it passes the reproducing sound head (not shown). The travel of the tape between the two reels is used to operate setting means 33 for setting the control system for the playback of a pre-selected section of tape. To this end, a drive is derived from one of the reels, reel 30 being shown, which turns a pointer or hand 34. As will be noted, the rotation of reel 30 in one or the other direction rotates a pulley 35 in the corresponding direction through a belt 36, a second pulley 37 and a reel shaft 38. Pulley 35 is drivingly coupled by any suitable means such as a gear drive in a box 39 to an arbor 40 mounting pointer 34. As is evident, any desired rate of turning of pointer 34 may be provided but any selected rate will be a function of the number of revolutions of reel 30 and hence of the tape movement through the machine. It is further evident that the transmission of the revolutions of reel 30 to pointer 34 is only shown diagrammatically and may be of any suitable design. Pointer 34 moves over a scale 41 calibrated in footage of tape length, or any other desired unit of length. The total calibration of the scale represents preferably the total length of the tape.

The turning of pointer 34 is used to operate two switches, one representing the beginning of a tape section selected for playback and the other the end thereof. The two switches are shown as miniature switches 4 and 5 of the kind known as Microswitches. The switches are mounted slidably in two tracks 42 and 43 formed in a plate 44. Switch 4 is slidable in track 42 and switch 5 in track 43. A calibration similar to the calibration on scale 41 may be provided on plate 44. Pointer 34 coacts with the switches by means of a depending actuating arm 45. This arm will switch the respective switch 4 or 5 from one switching position to another when and while arm 45 engages the respective switch. When arm 45 becomes disengaged from a switch, the same will return to its initial switching position. Switch controls of this kind are very well known in the art and a more detailed description thereof does not appear to be necessary for the understanding of the invention. As is now apparent, placement of switch 4 in a position on the scale representing the footage of the tape at the beginning of a selected section and placement of switch 5 in the position representing the end of the selected section will cause an operation of the switches by pointer 34 when the same is driven by the rotation of reel 30 over the positions occupied by switches 4 and 5. The switches may be secured by set screws 46 and 47 or any other suitable means in the selected positions. Let it be assumed for purpose of description that the tape section selected for playback extends from 10 feet to 60 feet of the tape.

Turning now to the circuit diagram of Fig. 2 this circuit diagram shows two limit switches marked LS4 and LS5, which represent the switch contacts proper of switches 4 and 5 of Fig. 1 controlled by the turning of pointer 34. The limit switches control a multiple position switching device shown as a stepping relay SR which in turn controls the playback normal speed forward drive represented by the block Play, the fast re-wind or reverse drive represented by the block Re-wind, and the means for stopping the normal forward drive, the fast re-wind drive and also the fast forward drive. These stop means are represented by the block Stop.

The stepping relay is shown as having eight stepping positions appropriately marked and three levels marked A, B and C. The stepper coil is designated by 1. The relay will home into position 1 after reaching position 8 in a conventional manner. Limit switches LS4 and LS5 are biased into the position closing contacts 1 and 2 unless they are actuated by arm 45 of pointer 34.

Let it now be assumed that it is desired to play back the selected tape section (10 feet to 60 feet of the tape). To this end, the operator starts the conventional fast forward drive of the machine (not shown). The resulting revolutions of the reel 30 turn hand 34 in clockwise direction from the illustrated position to the left of switch 4 toward the switch. When hand 34 reaches the position representing the 10 feet, it actuates switch 4 thereby closing switch contacts 1 and 3 of switch LS4 and opening contacts 1 and 2 of the limit switch. As a result, an energizing circuit for stepper coil 1 is closed. The coil steps the stepping relay from the position 1 into position 5 whereby the fast forward drive is stopped and the machine is switched to normal forward drive. In other words, the playback begins as soon as pointer 34 reaches the beginning of the selected tape section. More specifically the following circuit connections are effected.

The circuit for stepper coil 1 is closed from terminal D of a source of power through contacts 1 and 3 of limit switch LS4 closed by arm 45, contact A of the stepping relay, homing contacts 1 and 2 of stepper coil 1 back to terminal E of the source of power. As a result, the stepper coil steps the relay from position 1 into position 5 as stepping contacts 2, 3 and 4 in level A are connected. It comes to a halt in position 5 as the contact of this position is not connected to the aforetraced energizing circuit.

The circuit for stepping the relay into position 5 may be traced from terminal D, stepping relay contacts 2, 3, 4 in level A, contact A of the stepping relay, homing contacts 1 and 2 of stepper coil 1, coil 1 back to terminal E.

As a result of the stepping of the relay into position 5 the following circuit for the stop means is closed: Terminal D switch contacts 1, 2 of limit switch LS5, contact B of the stepping relay, contact 2 in level B of the stepping relay, block Stop and back to terminal E.

As will be noted, the fast forward drive is stopped by the activation of block Stop already when the stepping relay reaches position 3. When the stepping relay reaches position 4 the normal speed forward drive represented by block Play is activated through the following circuit: Terminal D through contacts 1, 2 of limit switch LS5, contact B of the stepping relay, contact 4 in level B, block Play and back to terminal E. The selected tape section is now being played back. As the tape continues to be wound up on take-up reel 31, now at normal playback speed, pointer 34 also continues to turn in clockwise direction thereby releasing limit switch LS4. Release of this limit switch causes disengagement of contacts 1 and 3 and re-engagement of contacts 1 and 2 of switch LS4. This closes a circuit for stepping the stepping relay from position 5 into position 6. This circuit may be traced as follows: From terminal D through contacts 1, 2 of limit switch LS4, stepping relay contact 5 in level A, contact A, homing contacts 1 and 2 of stepper coil 1, stepper coil 1 and back to terminal E. From position 6 the stepping relay continues into position 8 as the contacts of stepping positions 6 and 7 are directly connected to terminal D. From position 8 the stepping relay homes into position 1 through the following circuit: Terminal D, switch contacts 1 and 2 of limit switch LS5, step contact 8 in level A, contact A, homing contacts 1 and 2 of stepper coil 1, stepper coil 1, and back to terminal E.

The stepping relay remains in position 1 until pointer 34 or rather its actuating arm 45 reaches switch LS5 signifying the end of the selected tape section and trips this switch, that is, contacts 1 and 2 of limit switch LS5 are disengaged and contacts 1 and 3 become engaged. As a result, the stepping relay is now stepped through the following circuit: From terminal D, contacts 1 and 3 of limit switch LS5, contact A of the stepping relay, homing contacts 1 and 2 of stepper coil 1, stepper coil 1 and back to terminal E. The stepping relay again continues into position 5 in which it is halted in the same manner as previously described.

When the stepping relay reaches position 2 it reestablishes an activating circuit for block stop as follows: From terminal D through contacts 1, 2 of limit switch LS4 (now closed) stepping relay contact C, contact 2 in level C, block Stop and back to terminal E. As a result, the forward drive and the tape movement are halted. When the relay reaches position 4 it closes an energizing circuit for the fast re-wind drive as follows: From terminal D through contacts 1, 2 of switch LS4, stepping relay contact C, contact 4 in level C, block Re-wind and back to terminal E. The stepping relay now continues into position 8 in the same manner as has been previously described. Upon activation of the re-wind drive, pointer 34 and with it actuating arm 45 are turned by the corresponding tape movement in counterclockwise direction thereby moving away from switch LS5. As a result, contacts 1 and 2 become re-engaged. The re-engagement of contacts 1 and 2 of switch LS5 closes a circuit for returning the stepping relay from position 8 into position 1 as follows: From terminal D, contacts 1 and 2 of limit switch LS5, stepping relay contact 8 in level A, homing contacts 1 and 2 of stepper coil 1, stepper coil 1 and back to terminal E. While the tape is being re-wound, the speaker 50 is cut off by disengagement of normally closed contacts 51 of a switch MS6 actuated simultaneously with the energizing circuit for the re-wind block.

When pointer 34 has turned into the position representing the beginning of the tape section (10 feet) it again trips switch LS4 thereby repeating the aforedescribed cycle. This cycle will be automatically repeated without any action on the part of the operator until the operator elects to terminate it by shutting off the machine.

The circuit system according to Fig. 3 performs the same cycle which has been described in connection with Fig. 2 but the multiple position switching device shown as a stepping relay in Fig. 2 is replaced by a multiple position switching device employing rotary contact rollers. Corresponding components are designated in Fig. 3 by the same reference numerals.

The limit switches of Fig. 3 are deignated as switches LS6 and LS7 and are of somewhat different design in that they have only two contacts 1 and 3 which are disengaged unless operated. The operation of the limit switches of Fig. 3 should be visualized as being effected by a setting device of the kind described in connection with Fig. 1.

The exemplification of the multiple position switching device as shown in Fig. 3 comprises contact rollers 19, 7, 6, 18 and 17. Each of the contact rollers has on its periphery a contact area. The contact areas are of different circumferential length and indicated by shading. One slider contact 8, 5, 25 and 22 respectively coacts with rollers 7, 6, 18 and 17 respectively and roller 19 coacts with two slider contacts 26 and 26*a*. The five contact rollers and a cam disc 20 having a camming portion 21 are fixedly seated on a common drive shaft 16 which is driven by a suitable motor 13. The contact areas of rollers 7, 6, 18 and 17 are electrically interconnected. Cam disc 20 controls a switch MS2. The contact arm 3 of the switch closes contact 1 when an actuating linkage 15 between the cam disc and the switch rides on the remaining peripheral surface of cam disc 20.

All the components of the switching device are shown in the inactive positions, that is, the position in which none of the circuit connections of the switching device is energized.

Let it now be assumed that it is desired to play back a selected section of tape 32, and that the switches LS6 and LS7 are correspondingly pre-set as has been described in connection with Fig. 1. Let it further be assumed that the fast forward drive of the machine has been activated causing pointer 34 to turn in clockwise direction and that the pointer or rather its actuating arm 45 has reached and closed limit switch LS6 signifying the beginning of the tape section to be played back. Closing of switch contacts 1 and 3 of LS6 establishes an energizing circuit for motor 13 from terminal D through contacts 3, 1 of switch LS6, contact 1 and contact arm 3 of switch MS2, motor 13 and back to terminal E. Motor 13 will now begin to rotate shaft 15 in clockwise direction thereby removing camming portion 21 from linkage 15. As a result switch MS2 opens its contact 1 and closes its contact 2 thereby establishing a locking circuit for the motor from terminal D, contact 2, arm 3 back to terminal E. The motor will continue to rotate until contact 2 is re-opened by camming portion 21 thereby completing a cycle of its operation as will be more fully explained hereinafter.

After shaft 16 has begun to rotate the contact area of roller 7 is first turned into engagement with slider contact 8. The engagement of this contact area with slider contact 8 in conjunction with the closing of contacts 3, 1 of switch LS6 closes an energizing circuit for the stop mechanism of the machine indicated by the block labelled Stop. This circuit may be traced from terminal D through contacts 3, 1 of switch LS6 slider contact 5, the contact surface of roller 7 now in engagement with slider contact 8, the stop mechanism and back to terminal E. As a result, the fast forward drive is stopped. The continued rotation of shaft 16 moves the next contact surface of roller 17 into engagement with its slider contact 22. As a result, the energizing circuit for the normal speed playback mechanism of the device indicated by the block labelled Play is closed from terminal D through contacts 3 and 1 of switch LS6, slider contact 5 the contact surface of roller 6, the contact surface of roller 18, the contact surface of roller 17, slider contact 22 now engaging the contact surface on roller 17, the playback mechanism and back to terminal E. The playback of the selected tape section is accordingly started and pointer 34 resumes its turning movement in clockwise direction. As a result, contacts 1 and 3 of switch LS6 are released from actuating arm 45 and reopened. However, as explained in connection with Figs. 1 and 2, it is presumed that the playback mechanism continues to operate once it has been activated until it is stopped.

The rate of speed of motor shaft 16 is such that in the meantime motor 13 has completed one revolution thereby shifting arm 3 of relay MS2 from contact 1 to contact 2 by re-engagement between linkage 15 and camming portion 21. As a result, disengagement of contact 3 and arm 1 of switch LS6 will interrupt the motor circuit at the switch and the motor will come to a standstill with all the contact rollers in the position shown in Fig. 3.

When the end of the selected tape section is reached, actuating arm 45 on pointer 34 will engage and close contacts 1, 3 of switch LS7. As a result, the energizing circuit for motor 13 is re-established from terminal D through contacts 3, 1 of switch LS7, slider contact 25, contact area of roller 18, contact area of roller 6, slider contact 5, contact 1 and arm 3 of switch MS2, motor 13 and back to terminal E.

The resulting rotation of drive shaft 16 turns camming portion 21 of disc 20 out of engagement with linkage 15 thereby re-establishing the locking circuit of the motor through contact 2 and arm 3 of switch MS2 as previously described. The continuing rotation of shaft 16 moves again the contact surface of roller 7 first into engagement with slider contact 8. As a result an energizing circuit is re-closed for the stop mechanism which may be traced from terminal D through contacts 3, 1 of switch LS7, slider contact 25, the contact surface on roller 18, the contact surface on roller 6, the contact surface on roller 7, slider contact 8, the stop mechanism and back to terminal E, whereby the normal speed forward drive mechanism is stopped.

The rotation of motor 13 continues, its energizing circuit being closed through contact 2 and arm 3 of motor switch MS2, and moves the contact surface of roller 19 under slider contacts 26 and 26*a*. As a result, an energizing circuit is closed for the fast re-wind drive from terminal D, contacts 3, 1 of limit switch LS7 still closed, slider contact 26, the contact surface of roller 19, slider contact 26*a*, the re-wind block and back to terminal E. The re-wind drive now begins to re-wind the selected tape section and switch LS7 is released. The motor continues to rotate until stopped by engagement of camming portion 21 with linkage of switch MS2 thereby interrupting the motor circuit at contact 2 of switch MS2 after the motor has returned all the contact rollers into the illustrated position. It may be noted in this connection that contacts 1 and 3 of switch LS6 are open at this stage of operation. When the selected tape section has been re-wound to its beginning, or in other words when pointer 34 and with it arm 45 reach the position of switch 4 in Fig. 1, contacts 1 and 3 of switch LS6 are again closed.

The cycle of operations previously described is now repeated except that the switching operations initiated through the restarting of motor 13 by closing of switch LS6 now stop the fast re-wind drive rather than the fast foward drive which served to bring the tape to the beginning of the selected section when the machine was first started. The entire cycle repeats itself until finally stopped by shutting off the machine by the operator.

In the previously described exemplifications of the invention, the multiple position switching device is shown as being controlled by limit switches opened and closed by actuating means directly controlled by the tape movement. Such control arrangement is simple, reliable and inexpensive and it also lends itself to a readily understandable illustration. However, it should be pointed out that the invention is by no means limited to such an electro-mechanical control of the multiple position switching device. The switching device may also be controlled by magnetic or electric signals generated at the beginning and end of the selected tape section. It is for instance well known to provide on the tape at the beginning and end a small piece of metal foil or a blot of conductive or magnetic paint which when passing equipment sensitive thereto actuates the same. It is also possible to mark the beginning and end of a selected tape section by a notch or hole in the tape which is detected by appropriate switching equipment. Arrangements of this kind are generally used for instance with automatic slide projectors.

While the invention has been described in detail with respect to certain now preferred examples and embodiments of the invention, it will be understood by those skilled in the art after understanding the invention, that various changes and modifications may be made without departing from the spirit and scope of the invention, and it is intended therefore, to cover all such changes and modifications in the appended claims.

What is claimed as new and desired to be secured by Letters Patent is:

1. A machine for reproducing intelligence from an intelligence carrier of the kind having a reproduction normal-speed forward drive in combination with a device for reproducing a pre-selected section only of the intelligence carrier in the machine, said device comprising forward drive means for driving the carrier through the machine, a control member drivingly coupled with said drive means for movement jointly therewith, the movement of said control member being indicative of the distance of movement of the carrier through the machine, switch means controlled by the movement of said control member for activating said normal-speed drive at the beginning of the pre-selected section, and switch means also controlled by the movement of said control member for stopping said normal-speed drive at the end of the selected section.

2. A machine for reproducing intelligence from an intelligence carrier of the kind having a reproduction normal-speed forward drive and a re-wind drive in combination with a device for reproducing a pre-selected section only of the intelligence carrier in the machine, said device comprising forward drive means for driving the carrier through the machine, a control member drivingly coupled with said drive means for movement jointly therewith, the movement of said control member being indicative of the distance of movement of the carrier through the machine, switch means controlled by the movement of said control member for activating the normal-speed drive at the beginning of the pre-selected section, and switch means also controlled by the movement of said control member for successively stopping said normal-speed drive at the end of the pre-selected section and activating said re-wind drive.

3. A machine for reproducing intelligence from an intelligence carrier of the kind having a reproduction normal-speed forward drive and a re-wind drive in combination with a device for reproducing a pre-selected section only of the intelligence carrier in the machine, said device comprising reversible drive means for forward and rewind drive of the carrier through the machine, a control member drivingly coupled with said drive means for movement jointly therewith in either direction, the movement of said control member in either direction being indicative of the distance of the respective movement of the carrier through the machine, switch means controlled by the forward movement of said control member for activating the normal-speed drive at the beginning of the pre-selected section, switch means also controlled by the forward movement of said control member for successively stopping said normal-speed drive at the end of the pre-selected section and activating the re-wind drive, and switch means controlled by the re-wind movement of said control member for stopping the re-wind drive upon re-winding of said pre-selected section to the beginning thereof and then re-activating said forward drive.

4. A device for reproducing a pre-selected section of the intelligence carrier in an intelligence reproducing machine of the kind described, said device comprising a reproduction forward speed energizing circuit, a stop mechanism energizing circuit, a multiple position switching means having a first switching position closing said forward drive energizing circuit and a second switching position closing said stop mechanism energizing circuit, first control circuit means for moving said switching means into the first switching position, second control circuit means for moving said switching means into the second switching position, forward drive means for driving the carrier through the machine, a control member drivingly coupled with said drive means for movement jointly therewith, the movement of said control member being indicative of the distance of movement of the carrier through the machine, and actuating means operated by the control member movement at the beginning and the end respectively of the selected section, said actuating means coacting with said first control circuit means to activate the same at the beginning of the selected section, reversible drive means for forward and rewind drive of the carrier through the machine, a control member drivingly coupled with said drive means for movement jointly therewith in either direction, the movement of said control member in either direction being indicative of the distance of the respective movement of the carrier through the machine, and with said second control circuit means to activate the same at the end of said section.

5. A device for reproducing a pre-selected section of the moving intelligence carrier in an intelligence reproducing machine of the kind described, said device comprising a reproduction speed forward drive energizing circuit means, a stop mechanism energizing circuit means, a re-wind energizing circuit means, a multiple position switching means having a first switching position closing said stop mechanism energizing circuit means, a second switching position closing said forward drive energizing circuit means, a third switching position closing said stop mechanism energizing circuit means and a fourth switching position closing said re-wind drive energizing circuit means, reversible drive means for forward and rewind drive of the carrier through the machine, a control member drivingly coupled with said drive means for movement jointly therewith in either direction, the movement of said control member in either direction being indicative of the distance of the respective movement of the carrier through the machine, and control means for controlling the switching positions of said switching means, said control means being controlled by the movement of said control member and moving, at the beginning of the selected section, said switching means successively into the first switching position and the second switching position, at the end of the selected section, successively into the third switching position and the fourth switching position, and upon re-wind of the carrier to the beginning of the selected section again successively into the first switching position and the second switching position.

6. A device according to claim 5 wherein said control means comprise a pair of control switch means movable between two switching positions and connected in circuit with each other and said multiple switch means for causing positioning of the latter by switching of said control switching means from one switching position into the other, said movable member moving said control switch means from one switching position into the other when in the position representing the beginning and end respectively of the selected section.

7. A device according to claim 6 wherein said multiple position switching means comprise a stepping relay having several stepping positions and a stepper coil, said stepping positions and said stepper coil being connected in circuit with said control switch means and said energizing circuit means for causing stepping of the relay into the aforesaid positions to close said energizing circuit means in the aforesaid sequence.

8. A device according to claim 6 wherein said multiple position switching means comprise several rotary contact rollers, each having a peripheral contact area, said contact areas being circumferentially staggered relative to each other, a stationary contact means for each of said rollers, each of said stationary contact means being slidably engageable with the respective contact area, and electric drive means for jointly rotating said rollers to move said roller contact areas into and out of contact with the respective stationary contact means, different rotational positions of said rollers relative to the stationary contact means constituting said switching positions of the switching means, said roller contact areas, said stationary contact means and said roller drive means being connected in circuit with said control switch means for effecting closing of said energizing circuit means in the aforesaid sequence.

9. A device according to claim 6 wherein said control switch means are movable in relation to the path of movement of said movable member for varying the beginning and the end of the selected carrier section in relation to the length of the entire carrier.

References Cited in the file of this patent

UNITED STATES PATENTS 2,703,714 Demby ---------------- Mar. 8, 1955